United States Patent
McLoughlin et al.

(10) Patent No.: US 8,264,376 B1
(45) Date of Patent: Sep. 11, 2012

(54) AVIONICS CONTROL AND DISPLAY UNIT

(75) Inventors: Frank A. McLoughlin, Leawood, KS (US); Steven B. Willhoite, Louisburg, KS (US); Walter J. Rolston, Overland Park, KS (US); Joseph E. Gepner, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 347 days.

(21) Appl. No.: 12/477,280

(22) Filed: Jun. 3, 2009

Related U.S. Application Data (60) Provisional application No. 61/059,521, filed on Jun. 6, 2008.

(51) Int. Cl.
*G08B 21/00* (2006.01)

(52) U.S. Cl. ........ 340/945; 340/971; 340/973; 340/974; 701/14

(58) Field of Classification Search .................. 340/945, 340/971, 973–975, 980; 701/3, 14
See application file for complete search history.

(56) References Cited

U.S. PATENT DOCUMENTS

| | | | |
|---|---|---|---|
| 6,618,819 B1 * | 9/2003 | Adamovits et al. ............. | 714/13 |
| 6,832,138 B1 | 12/2004 | Straub et al. ..................... | 701/3 |
| 6,842,672 B1 | 1/2005 | Straub et al. ..................... | 701/3 |
| 6,985,801 B1 | 1/2006 | Straub et al. ..................... | 701/3 |
| 7,415,330 B2 * | 8/2008 | Saint Aroman et al. ......... | 701/14 |
| 7,724,259 B2 * | 5/2010 | Hedrick et al. ................. | 345/501 |
| 2008/0125923 A1 * | 5/2008 | Chesne et al. ..................... | 701/7 |
| 2009/0112380 A1 * | 4/2009 | Nutaro et al. .................... | 701/14 |
| 2009/0224945 A1 * | 9/2009 | Brehin et al. .................. | 340/973 |

OTHER PUBLICATIONS

LILO (boot loader) from http://en.wikipedia.org/w/index.php?title=LILO_(boot_loader)&oldid=134719296; Published May 2007.

Booting from http://en.wikipedia.org/w/index.php?title=Booting&oldid=133832071; Published May 2007.

Booting from http://en wikipedia.org/w/index.php?title=Booting&oldid=211987279; Published May 2008.

* cited by examiner

*Primary Examiner* — Brent Swarthout
(74) *Attorney, Agent, or Firm* — Samuel M. Korte; Mohammad M. Ali (57) ABSTRACT

A multi-product avionics control and display unit (CDU). In implementations, the CDU may include a display and a processor coupled with the display. The processor is configurable to operate in a first mode to cause the display to present standby primary flight information associated with the aircraft and a second mode to control and display operation of one or more aircraft systems associated with the aircraft.

25 Claims, 7 Drawing Sheets

AVIONICS CONTROL AND DISPLAY UNIT

CROSS-REFERENCE TO RELATED APPLICATIONS

The present application claims the benefit under the 35 U.S.C. §119(e) of U.S. Provisional Application Ser. No. 61/059,521, filed Jun. 6, 2008, which is herein incorporated by reference in its entirety.

BACKGROUND

Avionics products in an aircraft are uniquely motivated to minimize (1) weight (to support safe weight attributes and to maximize payload); (2) size (uniquely limited available space); (3) electrical power usage (limited electrical power available in an aircraft, particularly under emergency power conditions); (4) failure rates (to assure safety); and (5) complexity of operation (given the complexity otherwise inherent in flight operations). Products that integrate functionality contribute to achieving these objectives.

Aircraft have historically been equipped with typically a collection of mechanical or electro-mechanical flight instrument gauges that give a pilot information about the aircraft's position, orientation, speeds, and performance. The gauges commonly provide quite limited breadth of functionality—typically only a single function. For example, the instrument panel of an aircraft employing such gauges might include an attitude indicator that shows the aircraft's orientation relative to the horizon, an altimeter that gives information about the aircraft's height above some reference level (e.g. sea-level) by measuring the local air pressure, an airspeed indicator that shows the aircraft's speed relative to the surrounding air, a heading indicator or magnetic compass that displays the direction the aircraft is pointing relative to north, or a turn and bank indicator that displays the direction of turn and rate of turn of the aircraft.

More recently, integrated avionics systems have been replacing the [electro-]mechanical instrument gauges summarized above with one or more electronic displays for displaying primary flight information such as attitude, altitude, heading, vertical speed, and so forth, to the pilot. Integrated avionics systems may include one or more primary flight displays (PFD) and one or more multifunction displays (MFD). A representative PFD displays primary flight and selected navigation information that is typically received from one or more sensor systems such as an attitude heading reference systems (AHRS), an inertial navigation system (INS), one or more air data computers (ADC) and/or navigation sensors. A representative MFD displays information for navigation and for broad situational awareness such as navigation routes, flight plans, information about aids to navigation (including airports), moving maps, weather information, terrain and obstacle information, traffic information, engine and other aircraft systems information, and so forth. In some instantiations, a display that is normally used as a PFD or MFD may operate, for example under failure reversion circumstances, in a mode of operation during which PFD and MFD information are shown together on a display in some composite manner.

SUMMARY

An integrated avionics system is described that includes components that can provide various multi-product functionality. In implementations, one or more avionics control and display units (CDU) are provided. The CDU may include a display and a processor coupled with the display. The processor is configurable to operate in a first mode to cause the display to present standby primary flight information associated with the aircraft and a second mode to control and display operation of one or more aircraft systems associated with the aircraft.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWING FIGURES

The detailed description is described with reference to the accompanying figures. The use of the same reference numbers in different instances in the description and the figures may indicate similar or identical items.

The drawing figures do not limit the system to the specific embodiments disclosed and described herein. The drawings are not necessarily to scale, emphasis instead being placed upon clearly illustrating elements of the system.

DETAILED DESCRIPTION

Overview

To control an aircraft to a safe landing, a pilot ideally will have access to primary flight information that includes attitude (i.e. orientation), altitude, vertical speed, turn rate, heading, and/or airspeed. When flying in visual meteorological conditions (VMC), the attitude can be determined by looking out the window. However, in conditions where the pilot may be unable to determine the attitude of the aircraft by looking out the aircraft's windows, such as when flying within clouds or in other instrument meteorological conditions (IMC), the attitude and other primary flight information data are accessible to the pilot from the aircraft's integrated primary flight displays and/or individual primary flight instruments.

Integrated avionics systems employ independent standby instruments that may be utilized by the pilot to fly the aircraft in the event that primary flight information becomes either unavailable or incorrect on the primary flight display(s) or multifunction display(s). To help assure the availability and integrity of primary flight information, the instrument panel in many aircraft contain standby instrument gauges such as a standby attitude indicator, a standby altitude indicator, a standby airspeed indicator, and/or a magnetic compass. In other aircraft, integrated avionics systems may employ an integrated electronic standby instrument (IESI) to provide an independent source of attitude, altitude, and airspeed information instead of multiple instrument gauges.

Standby instruments used to provide primary flight information such as the instrument gauges and integrated electronic standby instrument mentioned above take up valuable space on the instrument panel, add cost, add weight, and add to maintenance needs for the aircraft in which they are employed.

Accordingly, a multi-product avionics control and display unit (CDU) is described that can be introduced into an integrated avionics system to, amongst other functionality, provide independent standby primary flight information without requiring the use of dedicated standby instruments. In implementations, one or more multi-product CDUs can be used as part of an integrated avionics system to control and display various information corresponding to one or more aircraft systems associated with the aircraft. "Aircraft system" as used herein, includes any software, electrical, or mechanical component, device, and/or system associated with the aircraft, including, for example, avionics, instrumentation, and/or control systems. The CDU may be used to control and/or display information related to the flight (e.g. flight plan, navigation, etc.) and/or aircraft system status (e.g. engine(s), electrical system, etc.).

The multi-product CDU(s) may be configurable to operate in a first mode to display independent standby primary flight information and in a second mode to receive pilot input and control and display operation of various aircraft systems. For instance, in one embodiment, each multi-product CDU may store a first software image configured to implement the first mode, a second software image configured to implement the second mode, and an image-loading module configured to cause either the first software image or the second software image to be loaded. The image-loading module is operable to cause the first software image to be loaded in response to an input so that the pilot may cause the CDU to reset and be placed in the first mode. In this manner, the pilot may cause the CDU to display primary flight information via selection of a mode switch.

In example embodiments, the multi-product CDU described above may be made sufficiently dissimilar to other elements of the integrated avionics system, such as the primary flight display (PFD) and the multifunction display (MFD), to mitigate the possibility that a common-mode failure could simultaneously disable the primary flight display, the multifunction display, and the multi-product CDU. For example, the multi-product CDU may be designed so that it has sufficiently independent electronic components and software elements with the primary flight displays and the multifunction displays of the integrated avionics system. To help assure sufficient independence, the multi-product CDU may also employ a different manufacturing facility than the PFD and MFD in the integrated avionics system. Further, the multi-product CDU may be communicatively isolated from the PFD and MFD while operating in the first mode to ensure proper independence from other components of the integrated avionics system.

In various implementations, the multi-product avionics CDU may have the following attributes: to segregate amongst the multiple product modes of operation; to satisfy distinctly different requirements and design assurance objectives associated with the different product modes; and to enter and exit these different product modes. As a result, the multi-product avionics CDU can operate as multiple distinct avionics products that leverage a common package and that operate when needed, thus saving weight, space, power, and acquisition and maintenance costs of having separately instantiated avionics products.

EXAMPLE EMBODIMENTS

Figure 1A:
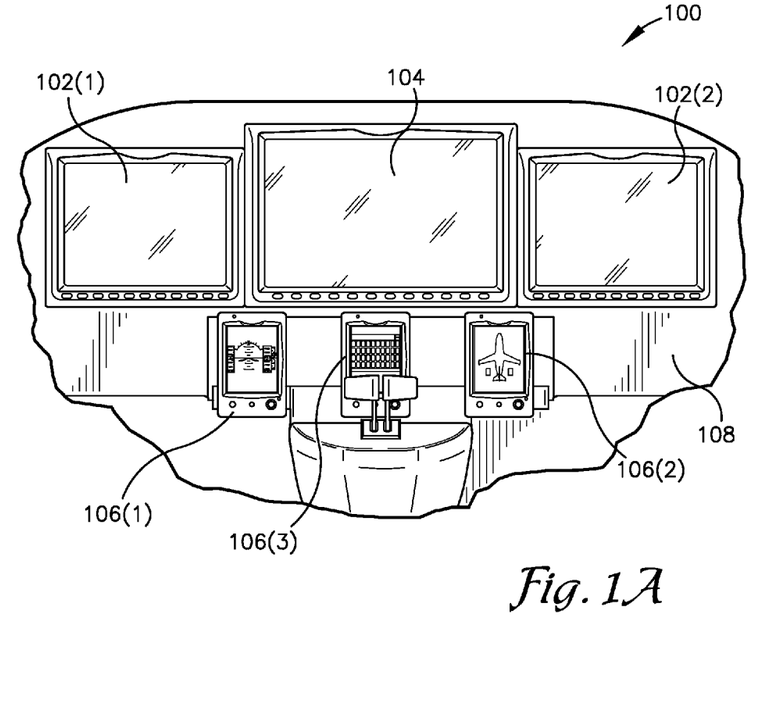
FIG. 1A is an illustration depicting a representative example instrument panel of an aircraft including an integrated avionics system configured in accordance with various embodiments of the present invention.
Figure 1B:
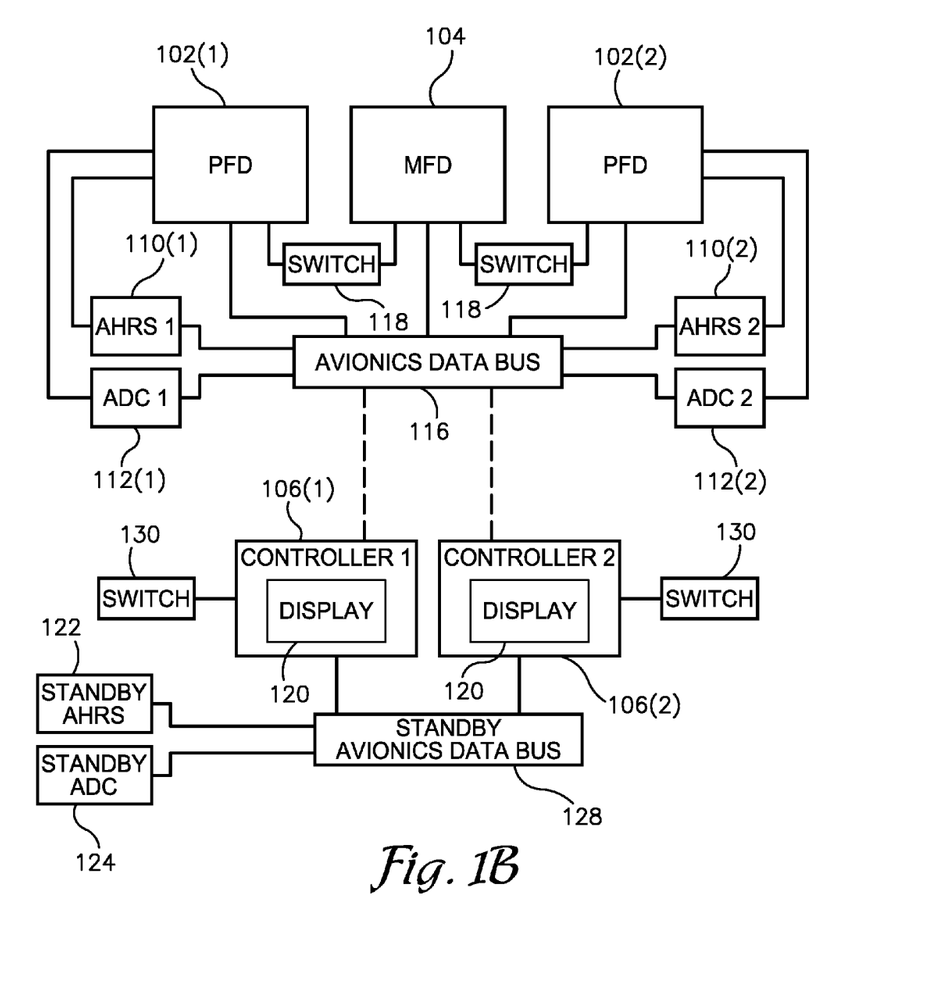
FIG. 1B is a first block diagram illustrating one embodiment of the example integrated avionics system shown in FIG. 1A.
Figure 1C:
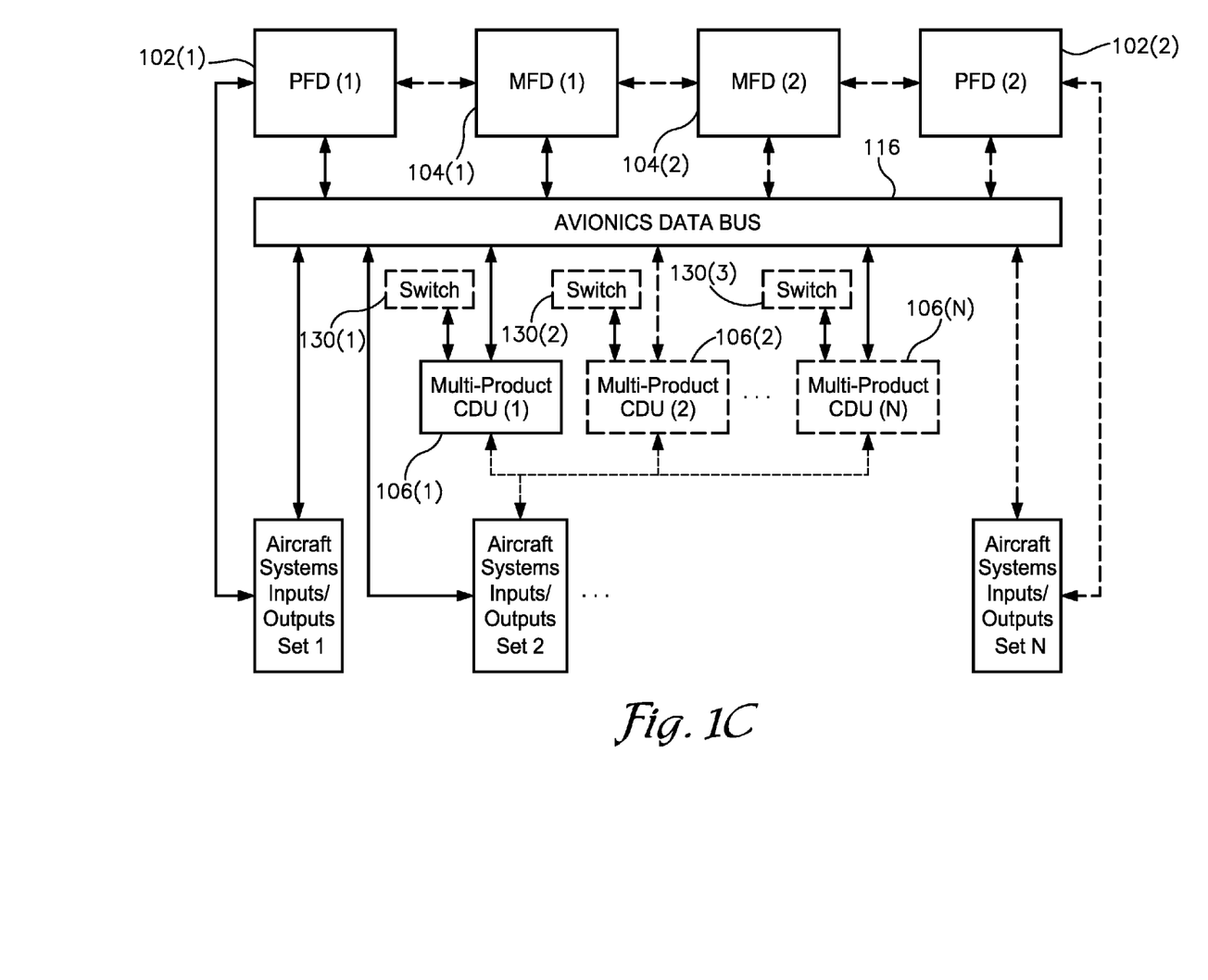
FIG. 1C is a second block diagram illustrating another embodiment of the example integrated avionics system shown in FIG. 1A.

Example embodiments of an integrated avionics system 100 that is configured to provide independent standby primary flight information without the use of dedicated standby instruments is illustrated in FIGS. 1A-1C. The integrated avionics system 100 may include one or more primary flight displays (PFDs) 102, one or more multifunction displays (MFD) 104, and one or more multi-product avionics control and display units (CDU) 106. For instance, in the embodiment illustrated in FIG. 1A, the integrated avionics system 100 may be configured for use in an aircraft that is flown by two pilots (e.g., a pilot and a copilot). In this embodiment, the integrated avionics system 100 may include a first PFD 102(1), a second PFD 102(2), an MFD 104, a first CDU 106(1), a second CDU 106(2), and a third CDU 106(3) that are mounted in the aircraft's instrument panel 108. As shown, the MFD 104 is mounted generally in the center of the instrument panel 108 so that it may be accessed by either pilot (e.g., by either the pilot or the copilot). The first PFD 102(1) and the first CDU 106(1) are mounted in the instrument panel 108 generally to the left of the MFD 104 for viewing and access by the pilot. Similarly, the second PFD 102(2) and the second CDU 106(2) are mounted in the instrument panel 108 generally to the right of the MFD 104 for viewing and access by the aircraft's copilot or other crew member or passenger. The third CDU 106(3) may be mounted between the first and second CDUs 106(1), 106(2). In embodiments, the CDUs 106 may be positioned within the instrument panel 108 so that they may be readily viewed by the pilot flying the aircraft (which could be either the pilot or copilot) to display standby primary flight information or other information.

The PFDs 102 may be configured to display primary flight information, such as aircraft attitude, altitude, heading, vertical speed, and so forth. In embodiments, the PFDs 102 may display primary flight information via a graphical representation of basic flight instruments such as an attitude indicator, an airspeed indicator, an altimeter, a heading indicator, a course deviation indicator, and so forth. The PFDs 102 may also display other information providing situational awareness to the pilot such as terrain information and ground proximity warning information.

As shown in FIG. 1B, primary flight information may be generated by one or more flight sensor data sources including, for example, one or more attitude, heading, angular rate, and/or acceleration information sources such as attitude and heading reference systems (AHRS) 110, one or more air data information sources such as air data computers (ADCs) 112, and/or one or more angle of attack information sources. For instance, in one embodiment, the AHRSs 110 may be configured to provide information such as attitude, rate of turn, slip and skid; while the ADCs 112 may be configured to provide information including airspeed, altitude, vertical speed, and outside air temperature. Other configurations are possible.

Integrated avionics units (IAUs) may aggregate the primary flight information from the AHRS 110 and ADC 112 and provide the information to the PFDs 102 via an avionics data bus 116. The IAUs may also function as a combined communications and navigation radio. For example, the IAUs may include a two-way VHF communications transceiver, a VHF navigation receiver with glide slope, a global positioning system (GPS) receiver, and so forth. As shown, each integrated avionics unit may be paired with a primary flight display, which may function as a controlling unit for the integrated avionic unit. In embodiments, the avionics data bus 116 may comprise a high speed data bus (HSDB), such as data bus complying with ARINC 429 data bus standard promulgated by the Airlines Electronic Engineering Committee (AEEC), a MIL-STD-1553 compliant data bus, and so forth.

The MFD 104 displays information describing operation of the aircraft such as navigation routes, moving maps, engine gauges, weather radar, ground proximity warning system (GPWS) warnings, traffic collision avoidance system (TCAS) warnings, airport information, and so forth, that are received from a variety of aircraft systems via the avionics data bus 116.

In implementations, the integrated avionics system 100 employs redundant sources of primary flight information to assure the availability of the information to the pilot, and to allow for cross-checking of the sources of the information. For example, the integrated avionics system 100 illustrated in FIGS. 1 and 2 employs two PFDs 102 that receive primary flight information from redundant AHRSs 110 and ADCs 112 via redundant IAUs. The integrated avionics system 100 is configured so that the first PFD 102(1) receives a first set of primary flight information aggregated by a first IAU from a first AHRS 110(1) and ADC 112(1). Similarly, the second PFD 102(2) receives a second set of primary flight information aggregated by a second IAU from a second AHRS 110(2) and ADC 112(2). Additionally, although a single avionics data bus 116 is illustrated in FIG. 1B, it is contemplated that redundant data buses may be employed for communication between the various components of the integrated avionics system 100.

In implementations, primary flight information provided by either the first AHRS 110(1) and ADC 112(1) or the second AHRS 110(2) and ADC 112(2) may be displayed on either PFD 102(1) or 102(2), or on the MFD 104 upon determining that the primary flight information received from either AHRS 110 and ADC 112 is in error or unavailable. Reversionary switches 118 may be selected by the pilot to configure the PFDs 102 or MFD 104 to display primary flight information from either the first AHRS 110(1) and ADC 112(1) or the second AHRS 110(2) and ADC(2). One or both of the PFDs 102 may also be configured to display information shown on the MFD 104 (e.g., engine gauges and navigational information), such as in the event of a failure of the MFD 104.

The integrated avionics system 100 may employ cross-checking of the primary flight information (e.g., attitude information, altitude information, etc.) to determine if the primary flight information to be furnished to either of the PFDs 102 is incorrect. In embodiments, cross-checking may be accomplished through software-based automatic continual comparison of the primary flight information provided by the AHRS 110 and ADC 112. In this manner, a "miss-compare" condition can be explicitly and proactively annunciated to warn the pilot went attitude information among displayed by either PFD 102 sufficiently disagrees.

The CDUs 106 may furnish a general purpose pilot interface to control the aircraft's avionics. For example, the CDUs 106 allow the pilots to control various systems of the aircraft such as the aircraft's autopilot system, navigation systems, communication systems, engines, and so on, via the avionics data bus 116. In implementations, the CDUs 106 may also be used for control of the integrated avionics system 100 including operation of the PFD 102 and MFD 104.

The CDUs 106 may be operable to provide independent standby primary flight information to the pilot. In implementations, one or both of the CDUs 106 may include a complementary display 120. The CDUs 106 may be configurable to operate in a first mode to provide standby primary flight information to the pilot(s) of the aircraft and a second mode to control operation of one or more aircraft systems. In some embodiments, the first mode may function as a reversionary mode. When a CDU 106 is operating in the second mode, the complementary display 120 of the CDU 106 may be used for the display information suitable for use by the pilot of the aircraft to control a variety of aircraft systems. However, when operating in the first mode, the complementary display 120 of the CDU 106 is used to display standby primary flight information. In some embodiments, the CDU 106 may be configurable to operate in any number of modes in addition to, or as an alternative to, the two modes discussed above.

As shown in FIG. 1B, standby primary flight information, which may include information such as attitude, altitude, heading, vertical speed, and so forth, may be generated by a standby attitude and heading reference system (AHRS) 122 and a standby air data computer (ADC) 124. Data generated by AHRS 122 and ADC 124 may be provided to one or more of the CDUs 106 via a standby avionics data bus 128. In implementations, one or more mode switches 130 may be selected by the pilot to cause any number of the CDUs 106 to operate in the first mode to display standby primary flight information. While operating in the first mode, the CDUs 106 may be disconnected from the avionics data bus 116 so that the CDUs 106 operate independently of and communicatively isolated from the primary components of the integrated avionics system 100 (e.g., the PFDs 102, the MFD 104, the AHRS 110, the ADCs 112, and so forth). For example, the CDUs 106 may not communicate with the avionics data bus 116 while in the first mode or may be physically disconnected from the avionics data bus 116 (e.g., via the mode switch 130, and so on).

In FIG. 1B, the integrated avionics system 100 is illustrated as including a single standby AHRS 122 and standby ADC 124, which provide standby primary flight information to two CDUs 106 that may be positioned for use by two pilots (e.g., a pilot and a co-pilot) as shown in FIG. 1A. However, it is contemplated that other configurations are possible. For example, in one implementation, additional standby AHRSs 122, standby ADCs 124, standby IAUs, and standby avionics data buses 128 may be employed to provide additional redundancy.

In example embodiments, the CDUs 106 may be made sufficiently dissimilar to other components of the integrated avionics system 100 such as the PFDs 102 and the MFD 104 to mitigate the possibility that a common mode failure may simultaneously disable the PFD 102, the MFD 104 and the CDUs 106. Similarly, the standby AHRS 122, standby ADC 124, and standby avionics bus 128 may be made sufficiently dissimilar to the AHRS 110, ADC 112, and the avionics data bus 116 to mitigate the possibility that a common mode failure may simultaneously disable these components. Sufficient dissimilarity between components may be accomplished in a number of ways. For example, the CDUs 106 may be configured so that they share no common electrical/electronic components and software elements with the PFDs 102 and the MFD 104. Components may be sized differently, furnished by different suppliers, selected from different batches, shipped at different times, and so forth. Software may employ different software modules or images and may be developed by different suppliers. The CDUs 106 may also employ in a different manufacturing facility. Similar measures may be taken to provide sufficient dissimilarity between the standby AHRS 122, standby ADC 124, and standby avionics bus 128 and the AHRS 110, ADCs 112, and the avionics data bus 116.

Figure 2:
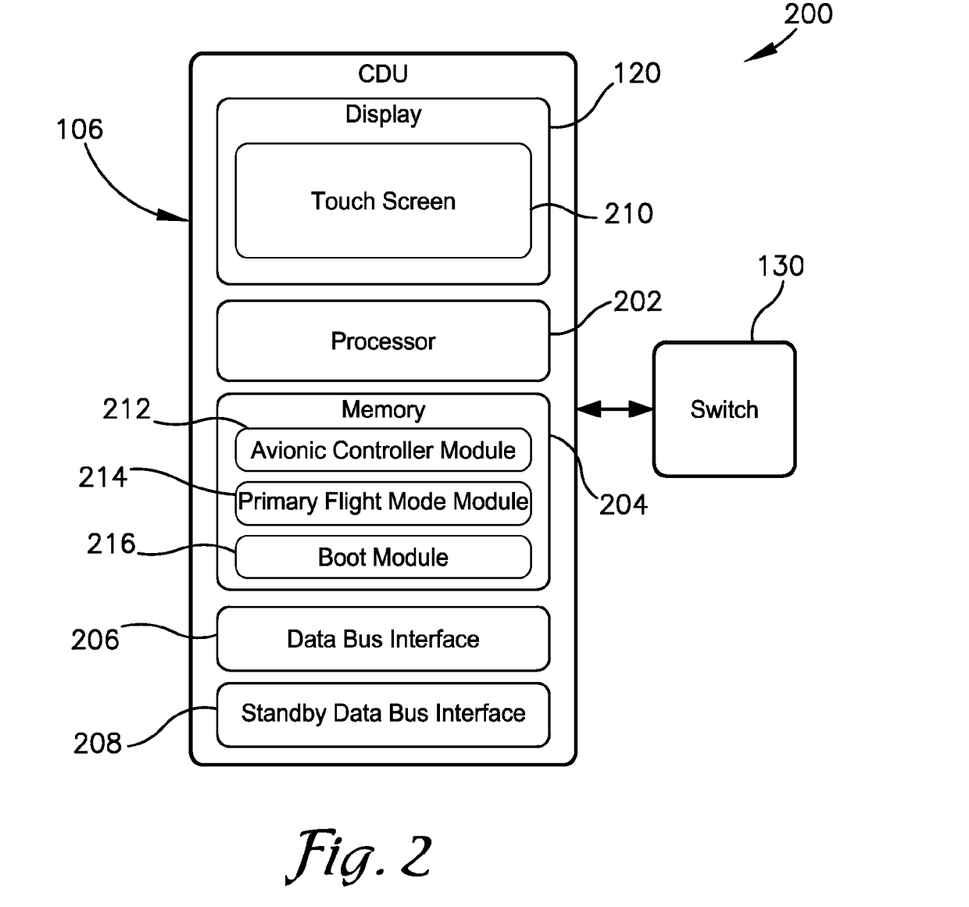
FIG. 2 is a block diagram illustrating an example multi-product avionics control and display unit (CDU) suitable for use by the integrated avionics system shown in FIGS. 1A-1C.

FIG. 2 illustrates a system 200 in an example implementation showing a representative CDU 106 of FIGS. 1A-1C in greater detail. The CDU 106 is illustrated as including a processor 202; a memory 204; one or more avionics data bus interfaces 206 & 208 and the complementary display 120.

The processor 202 provides processing functionality for the CDU 106 and may include any number of processors, micro-controllers, or other processing systems and resident or external memory for storing data and other information accessed or generated by the CDU 106. The processor 202 may execute one or more software programs which implement techniques described herein. The processor 202 is not limited by the materials from which it is formed or the processing mechanisms employed therein, and as such, may be implemented via semiconductor(s) and/or transistors (e.g., electronic integrated circuits (ICs)), and so forth.

The memory 204 is an example of computer-readable media that provides storage functionality to store various data associated with the operation of the CDU 106, such as the software programs and code segments mentioned above, or other data to instruct the processor 202 and other elements of the CDU 106 to perform the functionality described herein. Although a single memory 204 is shown, a wide variety of types and combinations of memory may be employed. The memory 204 may be integral with the processor 202, standalone memory, or a combination of both. The memory 204 may include, for example, removable and non-removable memory elements such as RAM, ROM, Flash (e.g., SD Card, mini-SD card, micro-SD Card), magnetic, optical, USB memory devices, and so forth.

The avionics data bus interface 206 and the standby avionics data bus interface 208 furnish functionality to enable the CDU 106 to communicate with one or more avionics data buses such as the avionics data bus 116 and standby avionics data bus 128, respectively, illustrated in FIG. 1B. In various implementations, the avionics data bus interface 206 and standby avionics data bus interface 208 may include a variety of components, such as processors, memory, encoders, decoders, and so forth, and any associated software employed by these components (e.g., drivers, configuration software, etc.).

The complementary display 120 displays information to the pilot of the aircraft. In embodiments, the complementary display 120 may comprise an LCD (Liquid Crystal Diode) display, a TFT (Thin Film Transistor) LCD display, an LEP (Light Emitting Polymer or PLED (Polymer Light Emitting Diode) display, a cathode ray tube (CRT) and so forth, capable of displaying text and graphical information. The complementary display 120 may be backlit via a backlight such that it may be viewed in the dark or other low-light environments.

The complementary display 120 may include touch interface such as a touch screen 210 that can detect a touch input within the area of the complementary display 120 for entry of information and commands. In embodiments, the touch screen 210 may employ a variety of technologies for detecting touch inputs. For example, the touch screen 210 may employ infrared optical imaging technologies, resistive technologies, capacitive technologies, surface acoustic wave technologies, and so forth. In implementations, buttons, keypads, knobs and so forth, may be used for entry of data and commands instead of or in addition to the touch screen 210.

As described above, the CDU 106 may be configurable to operate in a first mode to provide standby primary flight information to the pilot(s) of the aircraft and a second mode to control operation of one or more aircraft systems. When the CDU 106 configured to operate in the second mode, the complementary display 120 of the CDU 106 may be operable to display information suitable for use by the pilot of the aircraft to control a variety of aircraft systems. The touch screen 210 may be used by the pilot for entry of information and commands Conversely, when the CDU 106 is configured to operate in the first mode, the complementary display 120 may be operable to display standby primary flight information. In some embodiments, input via the touch screen 210 may be disabled when the CDU 106 is in the first mode.

In some embodiments, the CDU 106 may operate in modes in addition to, or as an alternative to, the two modes discussed above. For example, the various modes provided by the CDU 106 may include any combination of: an engine and airframe indication and control system mode; an entertainment system mode; a Controller/Pilot Datalink Communications (CPDLC) control and display mode; an Electronic Flight Bag (EFB) mode including a document viewer for checklists, Aircraft Flight Manuals (AFM), Pilot's Guides, and other documents; an imaging system mode for displaying camera inputs; a back-up Horizontal Situation Indicator (HSI) mode; a synoptics display system mode; a general communication systems mode (e.g. internet, text messaging, etc.); and the like.

Figure 3:
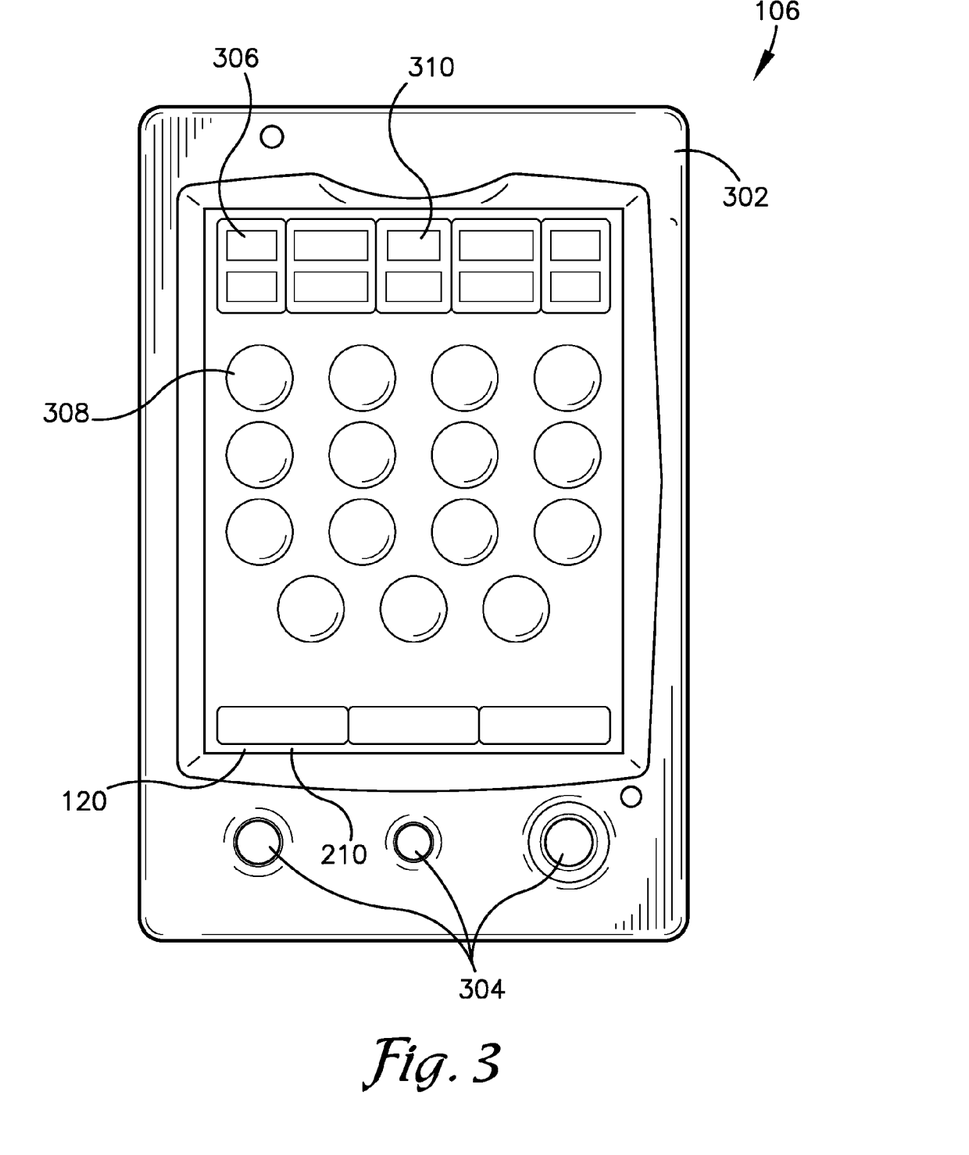
FIG. 3 is an elevation view illustrating the multi-product CDU of FIG. 2, wherein the multi-product CDU is depicted in one representative mode of operation.
Figure 4:
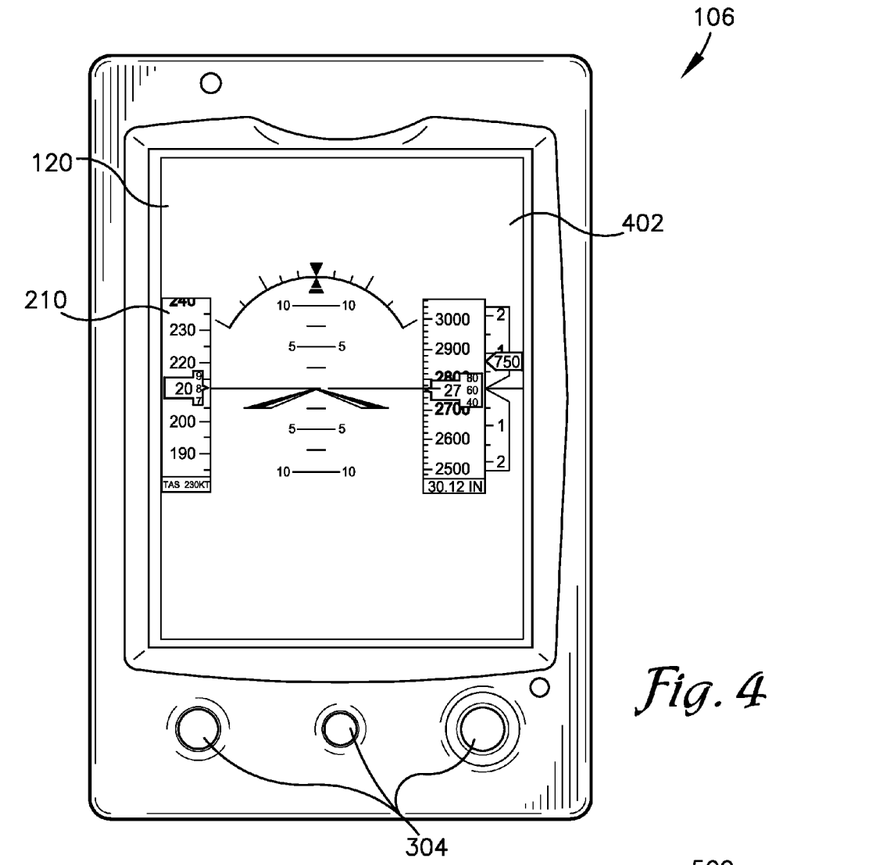
FIG. 4 is an elevation view illustrating the multi-product CDU shown in FIGS. 2-3, wherein the multi-product CDU is depicted in an alternative mode of operation that may, for example, become active under reversionary conditions.

FIGS. 3 and 4 illustrate an example CDU 106 configured for operation in the second mode (FIG. 3) and the first mode (FIG. 4), respectively. In the embodiment illustrated, the CDU 106 includes a bezel 302 that surrounds the complementary display 120 and touch screen 210 and aesthetically integrates the CDU 106 with the instrument panel 108 shown in FIG. 1A. One or more control knobs 304 may be provided in the bezel 302 adjacent to the complementary display 120 and touch screen 210.

As shown in FIG. 3, the complementary display 120 may be operable to display a graphical user interface (GUI) 306 while the CDU 106 is configured for operation in the second mode. In implementations, the GUI 306 includes graphical elements 308 such as menus, icons, buttons, windows, and/or other indicia, which may be selected by the pilot via the touch screen 210 to provide input to the CDU 106. The GUI 306 may also display text fields 310 for providing a variety data to the pilot. For instance, the GUI 306 may include text fields 310 that provide setting information such as radio frequency settings, autopilot settings, navigational settings and so forth. In embodiments, one or more of the settings may be adjusted by inputs from the pilot via the touch screen 210 and/or the control knobs 304.

When the CDU 106 is configured to operate in the first mode, such as in the event that primary flight information is not displayed by a PFD 102 or MFD 104, the GUI 306 may be at least partially replaced with or modified to include a graphical display 402 configured to convey the standby primary flight information to the pilot. For example, as shown in FIG. 4, the complementary display 120 may display primary flight information via a combined graphical representation of basic flight instruments such an attitude indicator, an airspeed indicator, an altimeter, and so forth.

Figure 6:
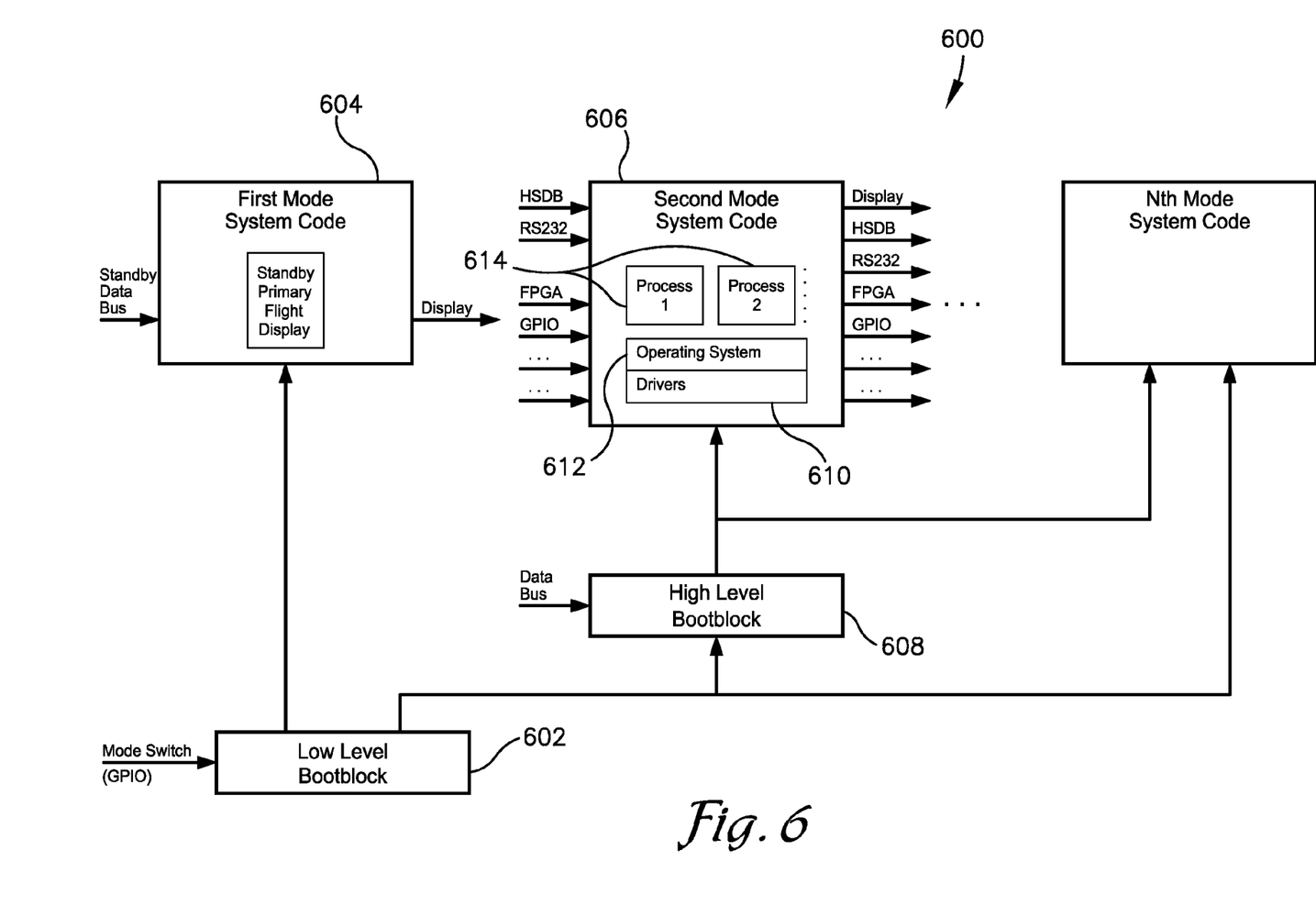
FIG. 6 is an illustration depicting an example software model employed by the processor of the multi-product CDU shown in FIGS. 2-5.

In implementations, the CDU 106 may employ different software images that cause the CDU 106 to operate in the various modes discussed above. "Software image," as utilized herein, refers to a stand-alone independently-loaded executable software module that does not depend on an underlying operating system external to the image for execution. For example, as shown in FIG. 6, the memory 204 of the CDU 106 may a first software image 604 configured to be loaded by the processor 202 to implement the first mode and a second software image 606 configured to be loaded by the processor 202 to implement the second mode. The first software image 604 may have a primary flight mode module 214 associated therewith to provide the standby flight information functionality discussed above. The second software image 606 may have an avionic controller module 212 associated therewith to provide the various controller and display functionality discussed above.

The CDU 106 may include additional or alternative software images to provide product functionality corresponding to any desired mode. Utilization of software images to implement the various modes may achieve desirable independence between the operating modes to eliminate common failures between the modes and images. For example, corruption of the second software image would not affect operation of the first software image. Further, each of the software images may include code or modules corresponding to more than one operating mode such that the processor may load a single software image, or a portion of a software image, to provide mode-related functionality. Thus, the memory 204 may include N software images each providing M operating modes, wherein N and M are at least 1.

The processor 202 may load one or more of the software images in a manner to provide mode functionality defined by the images. However, in some embodiments, a boot module 216 is provided that can be executed by the processor 202 to load any of the software images upon rebooting. In implementations, the boot module 216 may comprise one or more boot blocks configured to boot any of the software images or other boot blocks. For instance, in response to selection of the mode switch 130 by the pilot, the processor 202 may be rebooted, the boot module 216 may be loaded, and the processor 202 may load the first software image to provide the first mode functionality (e.g., the display of standby primary flight information) to the pilot. To switch from the first mode to the second mode, the pilot may function the mode switch 130 to select the second mode, thereby causing the processor 202 to reboot and load the second image.

In some embodiments, the first mode may be entered automatically and/or by default, such as in response to the failure of one or more components of the integrated avionics system 100 (e.g., the PFDs 102, the MFD 104, and so forth) or upon a cold restart of the CDU 106 or system 100. Further, in some embodiments, the various software images may be loaded by the processor 202 without requiring rebooting, such as by employing an image-loading module to dynamically load software images without rebooting.

Figure 5:
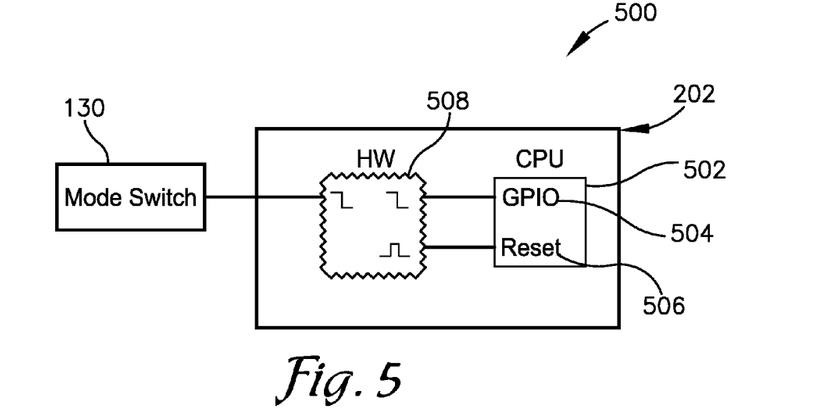
FIG. 5 is an illustration depicting an example hardware model employed by the processor of the multi-product CDU shown in FIGS. 2-4.

FIGS. 5 and 6 illustrate example hardware and software models 500 & 600, respectively, employed by the processor 202 shown in FIG. 2 to implement various operating modes. As illustrated in FIG. 5, the processor 202 may comprise a central processing unit (CPU) 502 that includes a general purpose input/output (GPIO) line 504 and a reset line 506 that receive an input via a hardware interface 508. To enter the first mode, the mode switch 130 is selected. The mode switch 130 may provide an input to the hardware interface 508 that toggles the GPIO line 504 and pulses the reset line 506 of the CPU 502 causing the processor 202 to reboot.

As shown in FIG. 6, when the processor is powered or reset (e.g., when the reset line 506 is pulsed in response to selection of the mode switch 130 causing the processor 202 to reboot as shown in FIG. 5), a portion of the boot module 216, such as a low level boot block 602, is loaded by the processor 202 to load either the first software image 604, the second software image 606, or any other code element for use by the processor 202. In one embodiment, the low level boot block 602 monitors the status of the GPIO line 504 (FIG. 5) to determine the appropriate software image 604 or 606 to load upon boot. For example, if the GPIO line 504 is powered, the low level boot block 602 may cause the first software image 604 to be loaded upon booting so that the CDU 106 is configured to operate in the first mode. In embodiments, the low level boot block 602 may boot a high level boot block 608 that in turn boots the second software image 606 and causes the various elements of the second software image to be loaded by the processor 202 to, for example, configure the processor 202 for use in the second mode. The high level boot block 608 may receive inputs to configure the second software image 606 from one or more avionic data buses (e.g., high speed data bus (HSDB)) as the system software is loaded. The second software image 606 may include system code that includes various elements such as one or more drivers 610, an operating system 612, one or more processes 614, and so forth. Various inputs and outputs (e.g., avionics data bus communications, RS232, FPGA (field programmable gate array), GPIO, Display, and so forth) may be utilized by the system code during normal operation of the CDU 106.

In the foregoing example, if the GPIO line 504 is not powered, such as when the mode switch 130 is actuated to toggle the GPIO line 504 and pulse the reset line 506, the low level boot block 602 may boot the first software image 604. The first software image 604 causes the processor 202 to implement system code that displays standby primary flight information. As shown in FIG. 6, the system code may be configured to receive standby primary flight information from the standby avionic data bus, while ignoring other inputs such as other data bus communications, and so forth.

As discussed above, the processor 202 may be operable to load any number of software images corresponding to any number of operating modes. Each software image may be loaded through any portion of the boot module 216. For example, some images may be loaded by the low level boot block 602 while other images may be loaded by the high level boot block 608.

In some embodiments, the boot module 216 may receive data from one or more of the software images that specify which image should be loaded upon the next reboot. For example, if processor 202 has currently loaded image N and the pilot selects some functionality associated with software image N+1, data may be stored in the boot module 216, or in memory associated with the boot module 216, to enable image N+1 to be loaded upon the next reboot of the processor 202. Such functionality enables the CDU 106 to easily transition between various products while still achieving product independence.

In some embodiments, the first software image may be defined by the boot module 216 as the default software image. For example, the position of the mode switch 130 may determine which image is loaded regardless of the data provided to the boot module 216 regarding the boot sequence. Thus, if the pilot selects the first mode using the mode switch 130, the processor 202 will reboot and load the first software image to ensure that standby primary flight information is available to the pilot—regardless of the functionality provided by the previously-loaded software image. Various examples of default image functionality include a default software image that is loaded by the processor 202 upon: any power-up/cold start regardless of any switch state; any reset regardless of the switch state; the toggle of a particular switch such as the mode switch 130 whenever the default software image is not currently loaded by the processor 202; combinations thereof; and the like.

In some embodiments, the processor 202 may occasionally verify the proper functionality of the first mode to prevent a latent failure of the first mode and associated standby primary flight information display. For example, the processor 202 may require the pilot to initially load the first image before loading other images to ensure proper functionality of the first mode. After proper functionality of the first mode is confirmed, the processor 202 may allow the loading of other software images as discussed above.

CONCLUSION

Although the integrated avionics system 100 has been described with reference to example embodiments illustrated in the attached drawing figures, it is noted that equivalents may be employed and substitutions made herein without departing from the scope of the invention as recited in the claims. Further, the integrated avionics system 100 and its components as illustrated and described herein are merely examples of a system and components that may be used to implement the present invention and may be replaced with other devices and components without departing from the scope of the present invention.

What is claimed is:

1. An avionics control and display unit (CDU) for use in an aircraft, the CDU comprising:
   a display;
   a memory operable to store a plurality of independent software images, wherein the software image does not depend on an underlying operating system external to the image for execution;
   a processor coupled with the display and the memory, the processor being configurable to:
      access a first one of the software images to operate in a first mode to cause the display to present standby primary flight information associated with the aircraft, and
      access a second one of the software images to operate in a second mode to control and display operation of one or more aircraft systems associated with the aircraft; and
   a switch coupled with the processor, the switch configured to cause the processor to reboot;
   wherein the first software image is accessed by default after a reboot of the CDU.

2. The CDU of claim 1, wherein loading of the first software image by the CDU communicatively isolates the CDU from other displays in an integrated avionics system.

3. The CDU of claim 1, wherein the display presents a graphical user interface that includes standby primary flight information when the processor is operating in the first mode.

4. The CDU of claim 1, wherein the memory further comprises a boot module configured to be executed by the processor to cause the first software image or the second software image to be booted.

5. The CDU of claim 4, wherein the boot module includes a low level bootblock operable to be executed by the processor to load one of the first software image or a high level bootblock, wherein the high level bootblock is operable to be executed by the processor to load the second software image.

6. The CDU of claim 1, wherein the memory comprises more than two software images and the processor is operable to access each of the software images to operate in any one of a plurality of operating modes.

7. The CDU of claim 1, wherein at least one of the software images is operable to provide more than one operating mode for the processor.

8. The CDU of claim 1, wherein the display includes a touch interface operable to allow selection of one or more indicia displayed by the display to control and display information about the one or more systems of the aircraft when the processor is operating in the second mode.

9. The CDU of claim 1, wherein the display presents a graphical user interface that includes elements that are selectable to control and display the one or more systems of the aircraft when the processor is operating in the second mode.

10. An integrated avionics system for use in an aircraft, the system comprising:
    a primary flight display (PFD) operable to display primary flight information;
    a multifunction display (MFD) operable to display information describing operation of the aircraft; and
    a control and display unit (CDU) including a complementary display, a memory including a plurality of software images, and a processor operable to selectively load one of the software images to cause the display to present information associated with the selected software image,
    wherein each of the software images do not depend on an underlying operating system external to the image for execution,
    wherein the memory includes a first software image operable to be loaded by the processor to cause the complementary display to display primary flight information independent of the PFD and MFD, and
    wherein the memory of the CDU further comprises a boot module configured to be executed by the processor of the CDU to cause the first software image to be booted by the CDU, such that the first software image selected by default after a reboot.

11. The system of claim 10, wherein the processor determines a failure of a PFD or MFD and selects the first software image.

12. The system of claim 11, wherein loading of the first software image by the CDU communicatively isolates the CDU from the PFD and MFD.

13. The system of claim 11, further including first and second flight sensor data sources, wherein the first flight sensor data source provides the primary flight information for use by the PFD and the second flight sensor data source provides the primary flight information for use by the CDU.

14. The system of claim 10, wherein the memory includes a second software image operable to be loaded by the processor to control and display operation of one or more aircraft systems.

15. The system of claim 14, wherein the second software image is configured to cause the complementary display to present a graphical user interface that includes elements that are selectable to control and display the one or more systems of the aircraft.

16. The system of claim 10, wherein the CDU is sufficiently dissimilar to the PFD and MFD to mitigate a common-mode failure of the CDU with the PFD or the MFD.

17. The system of claim 10, wherein the memory comprises at least two software images and the processor is operable to load one of the software images to operate in at least one operating mode associated with the loaded software image.

18. The system of claim 17, further comprising a switch configured to cause the processor to change to another mode in response to selection of the switch state.

19. The system of claim 10,
wherein the boot module includes a low level bootblock and a high level bootblock,
the low level bootblock operable to be executed by the processor to load a first software image or the high level bootblock,
the high level bootblock operable to be executed by the processor to load a second software image,
wherein the first software image is operable to be loaded by the processor to display primary flight information independent of the PFD and MFD.

20. The system of claim 10, wherein at least one of the software images is operable to provide more than one operating mode for the processor.

21. The system of claim 10, further including a plurality of PFDs or MFDs.

22. An avionics control and display unit (CDU) for use in an aircraft, the CDU comprising:
a display;
a memory operable to store a plurality of independent software images and a boot module, wherein the software images do not depend on an underlying operating system external to the images for execution; and
a processor coupled with the display and the memory, the processor being configurable to:
access a first one of the software images to operate in a first mode to cause the display to present standby primary flight information associated with the aircraft, and
access a second one of the software images to operate in a second mode to control and display operation of one or more aircraft systems associated with the aircraft;
wherein the boot module is configured to be executed by the processor to cause the first software image or the second software image to be booted, such that the first software image is accessed by default after a reboot of the CDU.

23. The CDU of claim 22, further comprising a switch configured to cause the processor to operate in one of the modes in response to selection of the switch.

24. The CDU of claim 23, wherein operation of the switch causes the processor to reboot and operate in the first mode by default.

25. The CDU of claim 22, wherein the boot module includes a low level bootblock operable to be executed by the processor to load one of the first software image or a high level bootblock, wherein the high level bootblock is operable to be executed by the processor to load the second software image.

* * * * *